Nov. 20, 1956   C. A. TANNER, JR   2,771,345
PREPARATION OF TITANIUM DIOXIDE PIGMENTS
Filed June 1, 1951
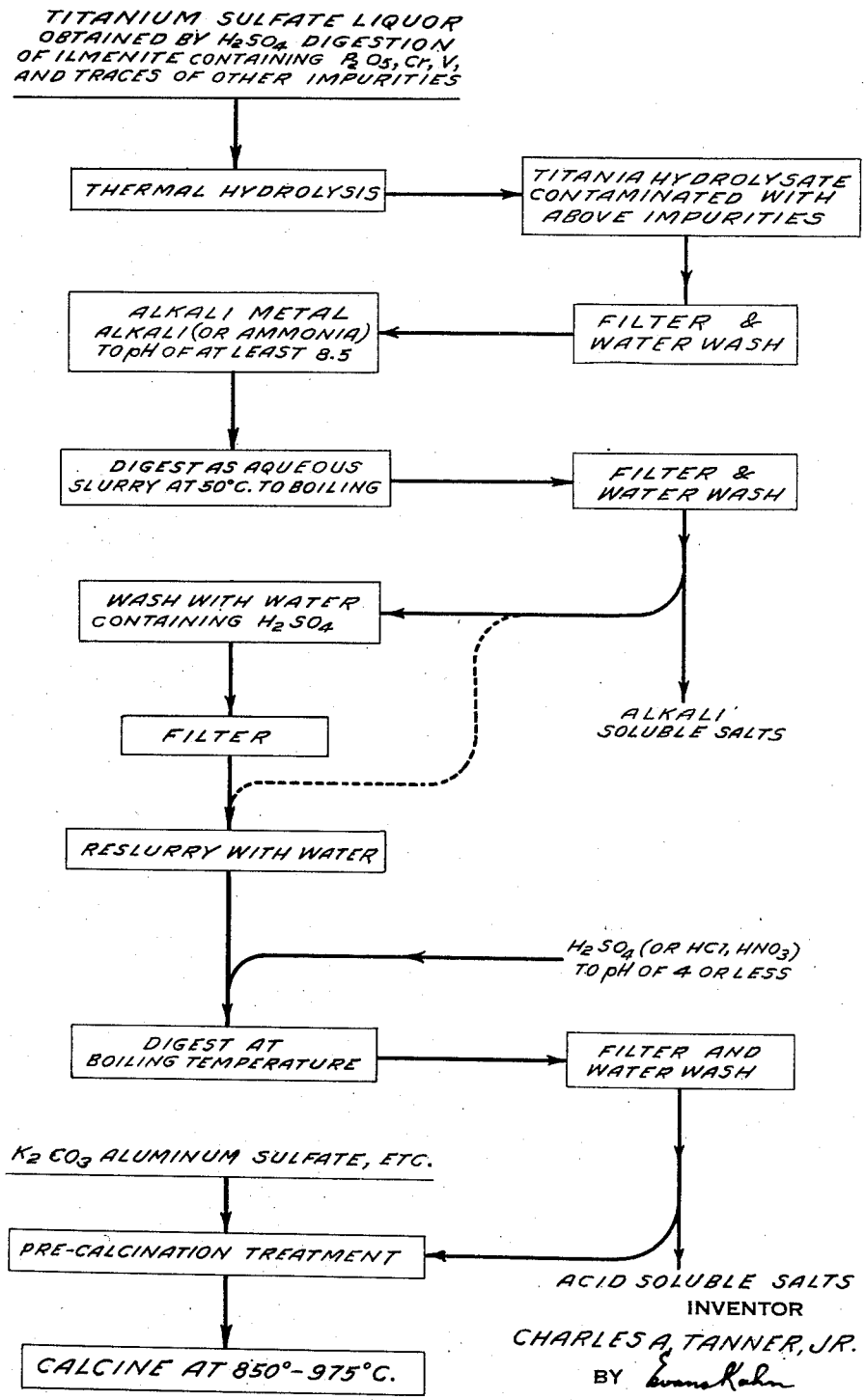
INVENTOR
CHARLES A. TANNER, JR.
BY
ATTORNEY

United States Patent Office 2,771,345
Patented Nov. 20, 1956

2,771,345
PREPARATION OF TITANIUM DIOXIDE PIGMENTS

Charles A. Tanner, Jr., Moorestown, N. J., assignor to American Cyanamid Company, New York, N. Y., a corporation of Maine Application June 1, 1951, Serial No. 229,482

7 Claims. (Cl. 23—202)

The present invention broadly relates to a process for the production of titania hydrolysate of very low chromium, vanadium, and phosphorus content, characterized in that it can be calcined to high quality rutile pigment in high yields at substantially lower temperatures than customary. This invention further relates to the production of improved titanium dioxide pigments and particularly rutile titanium dioxide pigments characterized by improved brightness, texture, oil absorption, and general pigmentary properties from this purified hydrolysate. The invention relates more particularly still to the removal of metallic and phosphatic impurities from washed titania hydrolysate obtained by thermal hydrolysis of titanium sulfate liquors and to the calcination of the purified titania to rutile titanium dioxide.

In the production of rutile titanium dioxide pigment by sulfuric acid digestion of titaniferous ores and by thermal hydrolysis of the titanium sulfate liquors so obtained, the hydrolysis product may contain as much as about 0.4% to about 0.8% or slightly more of phosphatic impurities calculated as $P_2O_5$. This is particularly true when the titaniferous ore is ilmenite obtained from nelsonite, although other ilmenite deposits also contain in excess of 0.2% of phosphatic impurities. In addition, the products of thermal hydrolysis ordinarily contain traces of other contaminants such as chromium, vanadium, boron, tungsten, columbium, zirconium, and lead compounds, as well as silicon and arsenic compounds. Some of these impurities are present in the ore while others are introduced from the equipment employed in the production of the pigment. A number of impurities such as chromium, vanadium, and iron apparently enter the rutile crystal lattices during calcination, thus causing abnormal crystal distortion and consequently a reduction in brightness of the pigment. Some of the other more acidic compounds including phosphorus, boron, and silicon cause vitrification of the titania during calcination and inhibit the transformation of anatase to rutile.

In general, it has been recognized that the presence of about 0.4–0.8% of phosphatic impurities serves to inhibit the conversion of the titania to the rutile crystal modification. Consequently, when more than about 0.4% of phosphorus compounds calculated as $P_2O_5$ are present in the titania hydrolysate, it has been necessary to resort to relatively severe calcination treatment in order to obtain substantially complete conversion of the hydrolysate to rutile. It has been found, however, that the conversion of such titania hydrolysates to rutile form may be effected without degradation of the pigment product by carrying out the calcination in the presence of small amounts of separately prepared rutile calcination seed. This improved method of producing rutile $TiO_2$ pigment has been disclosed and claimed in U. S. Patent 2,494,492 to L. E. Ross and C. A. Tanner, Jr. It has been appreciated by the pigment industry, however, that an even higher grade of rutile pigment would result from the removal of the remaining phosphatic and other impurities from titania hydrates prior to calcination thereof.

The present invention is concerned primarily with the removal of phosphatic and other impurities from titania hydrolysate, and the production of an improved rutile pigment from the purified titania. The accompanying diagram illustrates the preferred manner of carrying out the invention. Titanium sulfate liquor obtained by sulfuric acid digestion of ilmenite or other phosphate-containing titaniferous raw material is thermally hydrolyzed to provide a titania hydrolysate. This impure hydrolysis product is digested in water with an alkali to convert the phosphatic impurities to water-soluble condition, after which the slurry is filtered and washed. The washed titania is then reslurried in the presence of a strong acid-reacting compound, again digested, filtered, and washed to remove acid-solubilized impurities. The treated titania is thereafter calcined to produce the improved rutile pigment of the invention.

In carrying out the treatment with an alkaline compound followed by water washing to remove the soluble impurities, it has been found that the titania hydrolysate may become deflocculated, particularly after prolonged washing, causing serious difficulty in further handling of the material, which is then also unfit for calcination due to its altered structure and its metal cation content. It is an outstanding feature of the invention that this problem is overcome and the titania hydrolysate restored to its filterable original flocculated state by digestion with an acidic flocculating agent. Although any acid reacting compound may be used to flocculate the purified titania hydrolysate, the most active flocculating agents are the volatilizable strong inorganic and organic acids. The preferred acid flocculants, however, are the strong mineral acids, the anions of which are volatile at calcination temperatures, specifically sulfuric, hydrochloric, and nitric acids. A proportion of these flocculants are absorbed, and it is a further important feature of the invention that volatization of these flocculants during the calcination is beneficial in forming in the titanium compound a loose structure favorable for the formation of uniform, well-developed titanium dioxide particles.

In carrying out the method of the invention, sufficient alkali metal alkali is used to convert substantially all of the reactive impurities present in the titania slurry to water-soluble salts, but insufficient to convert the titania slurry to the metal titanate. Inasmuch as ordinary commercial titania hydrolysates contain from about 7% to about 10% of sulfuric acid, sufficient alkali must be used to neutralize this free acidity in addition to that necessary to solubilize the phosphorus and associated impurities. In this respect, it is enough to adjust the pH of the aqueous titania slurry to relatively strong alkalinity as, for example, a pH of at least 8.5 and preferably substantially higher, but insufficient to convert the slurry to the alkali metal titanate. The quantities of alkaline compound to be employed are not capable of more exact definition since the amounts of phosphatic and other impurities present in the titania vary considerably in accordance with the particular titaniferous ore employed. The alkaline digestion of the titania may suitably be carried out by simply heating the aqueous slurry for a period of time sufficient to completely solubilize the contaminating impurities, usually about one hour. In this respect, temperatures of from 50–6° C. up to the boiling point may be employed although obviously, the higher temperatures result in relatively shorter digestion periods.

In the washing operation following the caustic treatment, salts and caustic soda are gradually removed until a point is reached whereby deflocculation may occur on handling or otherwise disturbing the cake. The product may assume a fluid condition. Such a product is difficult to process and is unfit for calcination due to its deflocculated structure and sodium content. Under extreme alkaline conditions, titania hydrates strongly adsorb the alkali metal ions which are not completely removed by water washing. It has been found that the aforementioned difficulty may be overcome and a flocculated structure maintained by following the water wash with water containing a flocculating agent. Sulphuric acid is the preferred flocculating agent.

The quantities of acid flocculant to be used are dependent on the amount of cation remaining in the titania hydrolysate and the ease of flocculation of the particular titania. Simple acidification with very dilute sulfuric acid usually gives the best results. The subsequent reacidification is carried out by digesting the flocculated material with an acid having an anion which is volatile at 850° C. Sulfuric acid is also preferably used for this step and sufficient acid is used to give an initital pH of 4, preferably about 2 or even less. The slurry is heated with the acid until the absorptive capacity of the material for acid is substantially satisfied; ordinarily this requires only about one hour at the boil. This treatment removes absorbed and occluded sodium ions and aids in solubilizing and removing any heavy metal impurities remaining. Further, it effects reestablishment of essentially the original structure of the hydrate and replaces acid in the structure. The acid volatilized during the calcination is beneficial in imparting a loose structure favorable for the development of uniform particles of excellent pigmentary qualities.

The fact that the caustic digestion has been carried out at a pH of 8 or higher affords an additional advantage. While sulfuric acid digestion of ordinary titania hydrates presents no difficulties, similar heat treatments with HCl and HNO$_3$ are known to cause peptization. The colloidal mixtures thus obtained are unsuitable for pigment production inasmuch as they form products characterized by hard texture, low tinting strength and brightness values, and generally have undesirable physical properties. It is surprising, therefore, that the highly alkaline caustic-digested titania of the present invention may be acidified by any strong acid containing an anion, volatile at calcination temperatures, inclusive of hydrochloric and nitric acids, without undergoing this peptization.

When the above described alkaline and acid digestion treatment are followed, the phosphatic content of the titania hydrolysate is lowered typically by over 90% and a maximum removal of more than 98% has been attained. In addition, vanadium and chromium impurities have been reduced to about zero, lead to less than about 20 p. p. m., and iron to less than about 0.001% of the weight of the TiO$_2$ equivalent of the hydrolysate. An outstanding advantage derived from this removal of phosphorus compounds in that the hydrolysate may thereafter be calcined to produce a greatly improved pigment at temperatures which are appreciably lower than those of the presently employed commercial processes. For example, when employing a separately prepared rutile calcination seed, temperatures of from about 875° C. to about 950° C. are entirely adequate for substantially complete rutile formation, whereas it has formerly been necessary to employ temperatures of about 950–1000° C. or more to effect complete conversion to rutile. An additional advantage resides in the fact that shorter calcination cycles may be employed in obtaining this complete conversion to rutile and this feature is important inasmuch as it lessens the likelihood of excessive sintering or vitrification of the product and this, in turn, is reflected in improved texture, brightness, and the like pigment properties.

Any of the recognized rutile promoters may be employed, including hydrolysis seeding agents which are productive of hydrolysates which convert to rutile without additional persuasion. A preferred rutile promoter, however, is the hereinbefore mentioned separately prepared calcination seed of U. S. Patent 2,494,492. This patent discloses the preparation of an alkali metal titanate containing about 15% of Na$_2$O and about 85% of TiO$_2$. The alkali metal titanate is thereafter heated in water in the presence of sufficient HCl to completely neutralize the free alkali and to convert a substantial quantity of the titanium to its tetrachloride. After thus peptizing the titanium, the product is mixed with titania hydrolysate and functions as a rutile promoter during the calcination treatment. It is desirable to use from about 0.5% to about 3% of this calcination seed in order to promote complete conversion to rutile of the purified titania of the present invention. The seed may be added to the hydrolysate at any desired point. For example, it may be admixed with the initial hydrolysis product and be carried through the subsequent alkaline and acid digestion treatments. On the other hand, it may be found more desirable to add a water-washed calcination seed to the final hydrate immediately previous to calcination.

The invention will be more fully described by the following specific examples. It should be understood, however, that although these examples may describe in detail some of the specific features of the invention, they are given primarily for purposes of illustration and the invention in its broader aspects is not limited thereto.

*Example 1*

(A) To titania prepared by thermal hydrolysis of titanium sulfate and containing, on the calcined titanium dioxide basis, 0.70% P$_2$O$_5$, 0.20% Fe$_2$O$_3$, and traces of chromium, vanadium, and other impurities, was added 2.5% of a separately prepared rutile calcination seed prepared as described above. To a quantity of this material containing the equivalent of 200 g. of TiO$_2$ was added 9 cc. of 96% H$_2$SO$_4$ and 10 cc. of Ti$_2$(SO$_4$)$_3$ (100 g. per liter TiO$_2$ equivalent) after which the mixture was diluted with water to a volume of 900 cc. The addition of H$_2$SO$_4$ and titanous sulfate to the hydrolysate is for the purpose of bleaching the titania and to insure reduction of and subsequent complete removal of the iron contained therein.

The mixture was then heated for one hour at 60° C., filtered and water-washed. The washed titania was treated with 50 g. of NaOH, diluted to a volume of 1000 cc. with water, and then boiled for one hour. The slurry was thereafter filtered and washed with water after which it was again washed with 500 cc. of water to which had been aded 20 cc. of 96% H$_2$SO$_4$. The product was reslurried in water, treated with 9 cc. of Ti$_2$(SO$_4$)$_3$ and 50 cc. of 96% H$_2$SO$_4$ and again diluted to 1000 cc. with water, boiled for one hour, filtered and washed with 2000 cc. of water. To the filter cake was added 0.35% K$_2$CO$_3$, and aluminum sulfate equivalent to 0.018% Al$_2$O$_3$ based on the TiO$_2$. The treated material was then dried and calcined, starting at 700° C., raising the temperature uniformly to 900° C. in 3.5 hours, and continuing the calcination at this temperature for an additional 2 hours. The calcined product was an excellent soft-textured pigment of non-aggregated structure having a tinting strength of 1590 with a "very, very slight" brownish tint tone, an oil absorption of 22.1, and brightness value of 94, and contained less than 0.2% of P$_2$O$_5$. The conversion to rutile was substantially complete. The tint tone above referred to is evaluated by mixing the pigment with oil and carbon black and it is directly related to particle size. A definite brown tint tone indicates large pigment particle size average; a blue tint tone indicates fine particle size average; and a neutral tint tone is considered optimum. In the above evalution the pigment was quite close to optimum particle size for the most desirable pigmentary properties.

(B) The procedure of (A) was repeated except that the sodium hydroxide and the subsequent sulfuric acid treatments were omitted. Although the same amount of rutile calcination seed, chromium oxide, and potassium salt were present, the product required a final calcination of 6 hours at 975° C. to develop tinting strength and effect conversion to rutile due to the presence of 0.70% of $P_2O_5$ and other acidic constituents which inhibited both rutile conversion and crystal growth. The product had a brightness value of somewhat less than 90 and a tinting strength of 1570.

*Example 2*

830 g. of titania seeded with 2.5% of a separately prepared rutile calcination seed, and containing the equivalent of 300 g. of $TiO_2$, traces of numerous impurities and, based on the $TiO_2$, 7–10% $H_2SO_4$ and 0.60% of $P_2O_5$, was treated with 75 g. of NaOH and diluted to a volume of 1500 cc. with water, after which the slurry was boiled for one hour. Thereafter, the slurry was filtered, washed with 2500 cc. of water, again washed with 500 cc. of water containing 20 cc. of 96% $H_2SO_4$. The filter cake containing about 0.17% $P_2O_5$ was repulped in 125 cc. of 35% HCl, 10 cc. of $Ti_2(SO_4)_3$ was added, the volume of the mixture was adjusted to 1500 cc. with water, and the mixture was again boiled for one hour. After a final washing the titania was treated with 0.35% $K_2CO_3$, and aluminum sulfate equivalent to 0.02% $Al_2O_3$ based on the $TiO_2$. The hydrolysate was then dried and calcined at an initial temperature of 750° C., raising the temperature slowly to 875° C., and continuing the calcination at this temperature for 5 hours. After finishing treatments, the product had a brightness value in excess of 98, tinting strength of 1600, and oil absorption of 21.3. When formulated in an alkyd resin base enamel it showed excellent color retention and good resistance to fading when exposed to ultraviolet light in a fadeometer.

*Example 3*

(A) Titania hydrolysate substantially free of iron and treated with a rutile calcination seed was neutralized to pH 7.0 with NaOH and the product was washed substantially free of sodium sulfate. Only a trace of the original content of phosphorus (0.60% $P_2O_5$) was removed. The salt free titania, containing 200 g. of $TiO_2$ was treated with HCl to a pH of 2.0. The product was then diluted with water to 200 g. per liter of $TiO_2$ and boiled for ½ hour during which time the titania was peptized, forming a transparent sol. In an attempt to re-establish the original hydrolysate structure, the product was treated with 15 cc. of 96% $H_2SO_4$ and boiled for an additional ½ hour. The material was extremely difficult to filter and wash. After calcination, the product was hard and glossy, and was characterized by hard texture, tinting strength of approximately 1000, and was entirely unsuitable for pigment use.

(B) The procedure of 3(A) was repeated except that titania containing the equivalent of 200 g. of $TiO_2$ was treated with 50 g. of NaOH to give a pH of 11.5 after water dilution. The product was not peptized by the subsequent HCl treatment and produced a pigment having a tinting strength of 1570 and a brightness value of 94. The phosphorus content, expressed as $P_2O_5$, was 0.04%.

*Example 4*

(A) 600 g. of titania hydrolysate equivalent to a total of 200 g. of calcined $TiO_2$ and containing 2.5% of rutile calcination seed and 0.55% phosphorus as $P_2O_5$ was treated with 25 g. of NaOH, adjusted to a volume of 1000 cc. with water, and boiled for one hour. The slurry was filtered and washed with 1500 cc. of water. Its phosphorus content at this point was reduced only to 0.50% as $P_2O_5$, due to the use of insufficient caustic. The product was then washed with an additional 500 cc. of water containing 20 cc. of 96% $H_2SO_4$. The washed cake was repulped, treated with 50 cc. of 96% $H_2SO_4$ and a small amount of titanous sulfate, after which the mixture was diluted to 1000 cc. with water. The product was then boiled for one hour, filtered, washed, and treated with the ordinary calcination conditioning agents. The product was calcined for ½ hour at 900° C., ½ hour at 925° C., one hour at 950° C., and ¾ hour at 975° C. The calcined product had a tinting strength of 1550 and a brightness value of 90.

(B) The procedure of 4(A) was repeated except that 75 g. of NaOH were employed. The $P_2O_5$ content of the product was 0.01%, instead of 0.50% previously obtained. The product required calcining for only ½ hour at 900° C. and ½ hour at 925° C. to produce a substantially completely rutile $TiO_2$ having a tinting strength of 1590 and a brightness value of 94.

(C) The procedure of 4(A) was repeated except that 100 g. of NaOH was employed. The phosphorus removal was again substantially complete. However, there were indication that undesirable structural changes had taken place in the calcined product and although its pigment properties were satisfactory they were less desirable than those of the product obtained in Example 4(A).

I claim:

1. A method for the purification of a water-washed titania hydrolysate containing phosphatic impurities, which comprises (1) mixing an amount of an alkali metal hydroxide with an aqueous slurry of said hydrolysate sufficient to form water-soluble complexes of said impurities and adjust the pH of the slurry to at least 8.5 but insufficient to convert said hydrolysate to alkali metal titanate and digesting said mixture at a temperature between 50° C. and the boiling point thereof until solubilization of said impurities is substantially complete; (2) filtering and water-washing said alkali-treated hydrolysate thereby removing alkali-solubilized impurities including phosphatic impurities; (3) slurrying said hydrolysate with water and sufficient of a dilute mineral acid having an anion volatile at 850° C. to decrease the pH of the slurry to below 4; (4) digesting said slurry until the absorptive capacity of said hydrolysate for said acid is substantially satisfied; and (5) filtering and water-washing said acid-treated hydrolysate thereby removing acid-solubilized impurities.

2. A method according to claim 1 wherein the acid added for the digestion is sulfuric acid and sufficient of said acid is added to decrease the pH of the slurry to less than 2.

3. A method according to claim 2 wherein the slurry of acidified hydrolysate is digested between one-half hour and three hours.

4. A method for the production of titanium dioxide pigment of improved brightness and texture which comprises purifying an aqueous slurry containing phosphatic impurities by a method according to claim 1, and calcining the hydrolysate resulting therefrom at a temperature between about 850° C. and 950° C. in admixture with a small amount of separately-prepared rutile seed to yield rutile titanium dioxide pigment.

5. In a method of producing a titanium dioxide pigment wherein a crude titanium dioxide complex selected from the group comprising ilmenate ores, rutile ores, and titanium slags is digested with concentrated sulfuric acid to form soluble titanium sulfate and ferrous sulfate, said titanium sulfate is hydrolyzed to insoluble titania hydrolysate, said titania hydrolysate is water-washed to remove substantially all of said ferrous sulfate, and said washed hydrolysate containing phosphatic impurities is calcined to yield titanium dioxide pigment, the steps of purifying the water-washed hydrolysate by a method according to claim 1 and calcining the hydrolysate resulting therefrom at a temperature between 850° C. and 950° C. in the presence of a small amount of separately-prepared rutile seed to yield rutile titanium dioxide.

6. A method for the purification of a water-washed titania hydrolysate containing phosphatic impurities, which comprising mixing an amount of sodium hydroxide with an aqueous slurry of said hydrolysate sufficient to form water-soluble complexes of said impurities and adjust the pH of the slurry to at least 8.5, but insufficient to convert said hydrolysate to sodium titanate and digesting said mixture at a temperature of at least 50° C. until solubilization of said impurities is substantially complete; filtering and water-washing said alkali-treated hydrolysate whereby removing alkali-solubilized impurities including phosphatic impurities, slurrying said hydrolysate with water and sufficient of a dilute sulfuric acid to decrease the pH of the slurry of below 2, digesting said slurry until the absorptive capacity of said hydrolysate for said acid is substantially satisfied, and filtering and water-washing said acid-treated hydrolysate whereby removing acid-insolubilized impurities.

7. A method according to claim 6 wherein the slurry of acidified hydrolysate is digested at about the boiling point thereof for between one-half hour and three hours.

References Cited in the file of this patent

UNITED STATES PATENTS

| | | |
|---|---|---|
| 1,361,866 | Jebsen | Dec. 14, 1920 |
| 2,089,180 | Bousquet | Aug. 10, 1937 |
| 2,494,492 | Ross et al. | Jan. 10, 1950 |
| 2,516,604 | Tanner | July 25, 1950 |

OTHER REFERENCES

"Titanium," by Jelks Barksdale, pages 205, 206, 239–242, 359, 1949 ed. The Ronald Press Co., New York.